United States Patent [19]
Cotter
[11] 3,818,133
[45] June 18, 1974

[54] COORDINATE DIGITIZER INCREMENTAL SYSTEM

[76] Inventor: William L. Cotter, 70 Neptune St., Beverly, Mass. 01915

[22] Filed: Apr. 6, 1973

[21] Appl. No.: 348,688

Related U.S. Application Data

[63] Continuation-in-part of Ser. No. 130,969, April 5, 1971, Pat. No. 3,732,369.

[52] U.S. Cl. .................................................. 178/18
[51] Int. Cl. ........................................... G08c 21/00
[58] Field of Search ......................... 178/18, 19, 20; 340/347 AD, 347 SY, 347 P; 33/1 M

[56] References Cited

UNITED STATES PATENTS

| | | | |
|---|---|---|---|
| 3,342,935 | 9/1967 | Leifer et al. | 178/19 |
| 3,440,643 | 4/1969 | Teager | 178/18 |
| 3,567,859 | 3/1971 | Ellis | 178/18 |
| 3,588,345 | 6/1971 | Dym | 178/18 |
| 3,624,293 | 11/1971 | Baxter | 178/18 |

*Primary Examiner*—Thomas A. Robinson

[57] ABSTRACT

A system provides digital information of the incremental changes of the position of a stylus that is freely movable on a platen having a grid constituted by groups of parallel wires. Along each coordinate axis, wires of each group are interleaved with parallel wires of the other groups to form repetitively recurring sets of wires. Each set may, for example, have four wires, each wire being of a different group. To digitize the position of the stylus on one coordinate axis, the coordinate axis is scanned by exciting all wires of a group simultaneously with an electrical signal that couples by capacitance to an electrical conductor at the tip of the stylus. the electrical signal impressed on a group of wires may, for example, have a characteristic modulation or the signal may occur in an exclusive time interval. The signal coupled to the stylus can thus be identified as originating from a specific wire group. The stylus signals are combined to derive "sine" and "cosine" signals. The "sine" and "cosine" signals are periodic waveforms which are generated when the stylus is moved along the coordinate axis. The periodic waveforms divide the platen into divisions and subdivisions. The ratio of the "sine" signal to the "cosine" signal gives the position of the stylus on the coordinate axis. However, that position recurs periodically along the axis. As the stylus moves along the platen, each crossing of a subdivision causes the generation of a pulse which is emitted at one output for one direction of stylus movement along the axis and is emitted at a different output for movement of the stylus in the opposite direction. The pulses are accumulated in an up-down (viz., reversible) counter which keeps track of the stylus position along one coordinate axis. The position of the stylus along the other (i.e., second) coordinate axis is obtained by scanning the second axis in a similar manner and accumulating the pulses in a second up-down counter. The information in the up-down counters is continually up-dated by alternately scanning the two coordinate axis at a rapid rate to permit the track of the stylus to be accurately reconstructed.

4 Claims, 21 Drawing Figures

COORDINATE DIGITIZER INCREMENTAL SYSTEM

This application is a continuation in part of application Ser. No. 130,969, filed Apr. 5, 1971, now U.S. Pat. No. 3,732,369, issued May 8, 1973.

RELATED APPLICATION

In my said co-pending patent application there is described a coordinate digitizer system having a "coarse" grid of wires and a "fine" grid of wires which together permit coordinates to be obtained that define, in "absolute" terms, the position of a stylus on the surface of a platen. In that "absolute" system, the fine wire sub-system serves to sub-divide the interval between adjacent course wires. In contrast to an "absolute" system, an "incremental" system is concerned only with changes in the position of a stylus. The coordinate digitizer incremental system here disclosed employs the fine wire sub-system described in my aforesaid copending patent application. Because the "coarse" sub-system is not employed in the incremental system, it is necessary when using the fine sub-system to provide a means for indicating the direction in which the stylus is moved. Consequently, this application is a continuation in part of subject matter originally disclosed in that earlier application to which has been added a description of the apparatus which ascertains the direction of movement of the stylus.

FIELD OF THE INVENTION

This invention relates in general to electronic systems of the type which track the movement of a stylus upon a surface and provide digital information regarding the position of the stylus. More particularly, the invention pertains to a coordinate digitizer of the "incremental" type which provides information regarding the movement of the stylus by relating subsequent positions of the stylus to earlier positions. In the incremental system, the information is in the form of the direction and amount of movement relative to an earlier position of the stylus. In contrast, the more complex "absolute" type of system, such as is described in my aforesaid copending application, gives information as to the location of the stylus relative to the surface.

DISCUSSION OF THE PRIOR ART

Electronic devices are known which represent the track of a stylus as a sequence of coordinates which designate points on a surface. Such electronic devices are disclosed in U.S. Pat. Nos. 3,588,345 and 3,624,293. An objective of such electronic devices is to quickly and accurately measure the position of the stylus to permit tracking the stylus when it is rapidly moved. U.S. Pat. No. 3,342,935 to Leifer et al. discloses a stylus position locating system employing a platen having orthogonal sets of parallel wires. In the Leifer system, the location of the stylus is determined by ascertaining which wire the stylus is closest to. To do this, the sets of wires are energized by signals which capacitively couple to the stylus. Amplitude discrimination is employed to determine which wire is nearest to the stylus. It is evident that as the wires are placed more closely together, a problem arises in determining which of the wires is closest to the stylus. The resolution of the Leifer system is, hence, limited by the spacing of the wires in the grid. Further, in the Leifer system, operation of the system is impaired if the stylus is lifted off the platen inasmuch as the amplitude of the signals coupled to the stylus is dependent upon the distance of the stylus to the wires. Moreover, in the Leifer system such factors as "hand capacity" (viz., the capacity of the hand holding the stylus) have a disruptive affect upon the operation of the system.

In other "prior art" stylus position locating systems, resistive layers are employed on the platen surface. Such systems rely upon the establishment of an electric potential gradient across the platen to identify the location of the stylus on the resistive surface. In such systems, the stylus must contact the surface in order to pick up the electric potential at the point of contact. Systems of this kind are basically "analog" in nature and are limited in accuracy and resolution by the precision with which the potential gradient can be established. As the surface increases in area, establishment of the requisite potential gradient becomes more difficult without employing electric potentials that are hazardous.

Other "prior art" stylus position locating systems utilize magnetic coupling to the stylus. In one such system, four continuous conducting grid structures are laminated together to form the digitizing surface. Although the system can accomplish its purpose, aligning of the four grid structures presents a difficulty in fabricating an operable embodiment.

OBJECTS OF THE INVENTION

The primary object of the invention is to provide a stylus position locating system of the incremental type which is inherently digital in nature.

Another object of the invention is to provide an incremental type coordinate digitizer that is sufficiently simple to permit it to be built at moderate cost and yet provide good resolution and be capable of operation at the speed required to follow the motion of a stylus moving with the speed customary in manual drawing.

A further object of the invention is to provide an incremental type coordinate digitizer having no inherent limitation on the surface area over which the system can operate and in which enlargement of the surface area does not necessarily affect the resolution of the system.

SUMMARY OF THE INVENTION

The invention employs a platen having a grid formed by crossed sets of parallel wires spaced regularly along two coordinate axes. Along each axis, the parallel wires are arranged in four interleaved groups so that the wires of each group are periodic along the axis. In the operation of the invention, a coordinate axis is scanned by energizing all wires of a group simultaneously with an electrical signal that couples by capacitance to an electrical conductor at the tip of the stylus. The electrical signal applied to a group of wires may have a characteristic modulation whereby the signal coupled to the stylus can be identified as originating from a specific wire group. Alternatively, each wire group can be pulsed in its own exclusive time interval so that the signal coupled to the stylus is known to come from the pulsed wire group through the time of its occurrence. Whatever mode of operation is used, the signals coupled to the stylus can be "sorted out" according to the wire groups from which they originated. The stylus signals from the different wire groups are combined to derive "sine" and "cosine" signals. The "sine" and "cosine" terminology characterizes two signals having identical periodic waveforms which are displaced in phase relative to one another. Such signals are generated when the stylus is moved along the coordinate axis. In effect, the periodic waveforms divide the platen into divisions and subdivisions. The ratio of the "sine" signal to the "cosine" signal gives the position of the stylus on the platen. However, that position recurs periodically along the coordinate axis. As the stylus is moved along the platen, each crossing of a subdivision causes a pulse to be generated. The pulse is emitted at one output when the stylus moves in one direction along the coordinate axis; when moving in the opposite direction, the pulse is emitted from a different output. The pulses are accumulated in an up-down (i.e., reversible) counter which permits continuous tracking of the stylus position along one coordinate axis. To obtain the position of the stylus on the second coordinate axis, the second coordinate axis is scanned and the pulses are accumulated in a second up-down counter. By alternately scanning the two coordinate axes the information in the up-down counters is continually updated to permit the track of the stylus to be reconstructed. Inasmuch as the information entered in the counters only relates to changes in position of the stylus, an exact reconstruction of the position of the stylus relative to the platen can be obtained only if the position of the stylus on the platen at the start of the track is known and the stylus is not disturbed (as by lifting it off the platen) during reconstruction of the track. The information in the counters can be repetitively fed to a memory to accumulate a history of the movement of the stylus whereby the track of the stylus can be reconstructed at a later time. The transfer of information into the memory can be accomplished in the manner described in my aforesaid co-pending patent application. After a coordinate axis is scanned, the count in the counter for that axis can be entered in the memory while scanning of the other coordinate is in progress. Thus, the count in each counter is alternately entered into the memory to provide a continually up-dated record of stylus movement.

THE EXPOSITION

Figure 1:
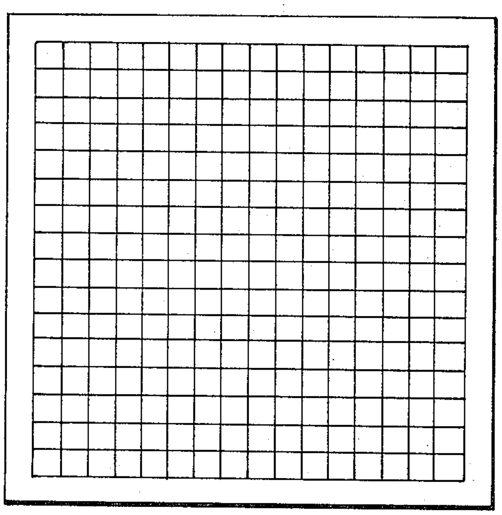
FIG. 1 shows a platen of the type employed in the preferred embodiment of this invention.

FIG. 1 depicts a platen having an electrically insulative surface whose area is divided into segments by a first array of parallel conductors crossing a second array of parallel conductors extending in an opposite direction and together forming a grid structure. For ease of exposition, the two arrays of wires are shown as being orthogonal so that the surface is divided into squares. Any point on the surface of the platen can be defined by X and Y Cartesian coordinates.

Figure 2:
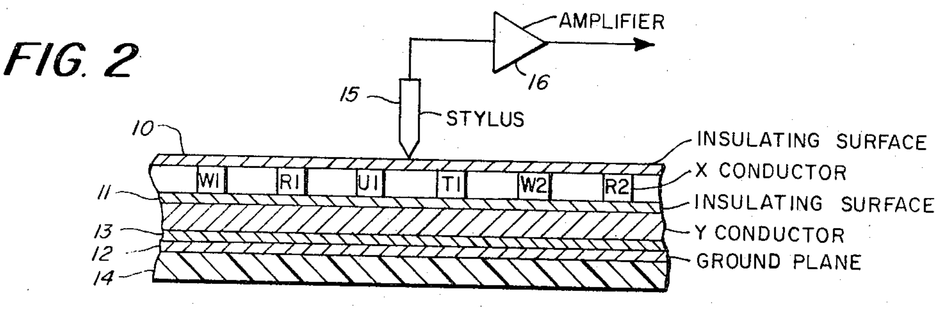
FIG. 2 shows a cross-section of a portion of the platen and illustrates the disposition of electrical conductors in the grid.

Turning now to the portion of the platen shown in cross-section in FIG. 2, the X Cartesian conductors are numbered W1, R1, U1, T1; W2, R2, etc., starting from the left edge of the grid. The X Cartesian conductors are situated between an upper insulator surface 10 of the platen and an intermediate insulative layer 11 which separates the set of X Cartesian conductors from an underlying Y set of Cartesian conductors. Below the two sets of conductors is a ground plane 12 which is an electrically conductive sheet having an insulator 13 interposed between the ground plane and the lower set of parallel conductors. To provide an adequate support for the platen, the ground plane is disposed upon a support plate 14 which preferably is an insulative substance.

A stylus 15 is shown in FIG. 2 disposed between X Cartesian conductors U1 and T1. The stylus 15 has an electrical conductor at its tip which is coupled to the input of an amplifier 16. The electrical conductor may, for example, be a pencil lead to permit the stylus to be employed to mark a sheet of paper laid upon the platen. Inasmuch as the stylus 15 carries an electrical conductor, capacitance exits between the stylus and the subjacent U1 and T1 conductors. To a lesser extent, capacitance exists between the stylus and other conductors in the X set as well as between the stylus and the conductors in the Y set. For the present, we need consider only the X set of wires in relation to the stylus.

An essential aspect of the present invention is the development from signals capacitively coupled to the stylus of two waveforms which are spacially periodic with respect to the wires of a coordinate set. Because the two waveforms are periodic and are displaced in phase from each other, the two waveforms are hereinafter termed the "sine" and "cosine" signals although those signals need not be sinusoids.

Figure 3:
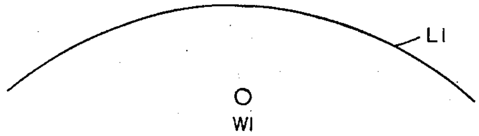
FIG. 3 is a plot of the stylus signal amplitude which is obtained when the stylus is moved across a pulsed wire of the "fine" grid.
Figure 4:
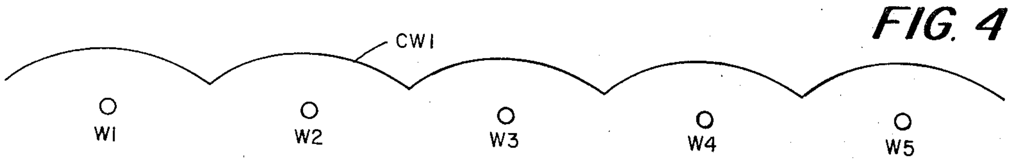
FIG. 4 is a plot of stylus signal amplitude for a group of pulsed wires.
Figure 5:
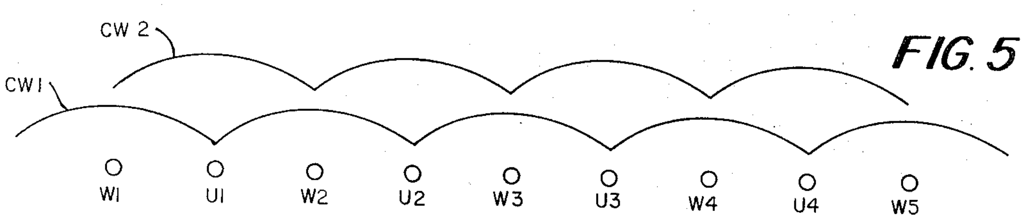
FIG. 5 depicts the signal amplitude plot obtained when two groups of wires are pulsed in turn.
Figure 6:
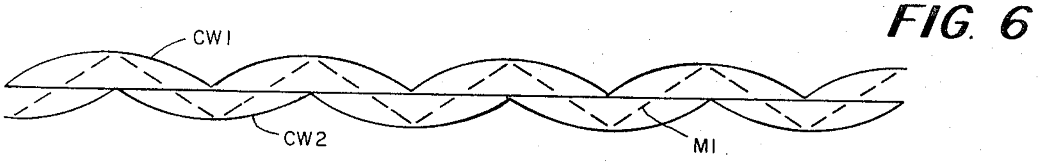
FIG. 6 indicates the manner in which a periodic signal is developed from the signal amplitude plots.
Figure 7:
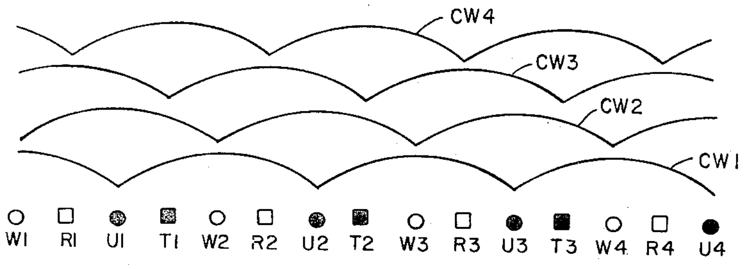
FIG. 7 indicates the signal amplitude plots obtained when four groups of wires are each pulsed in its turn.
Figure 8:
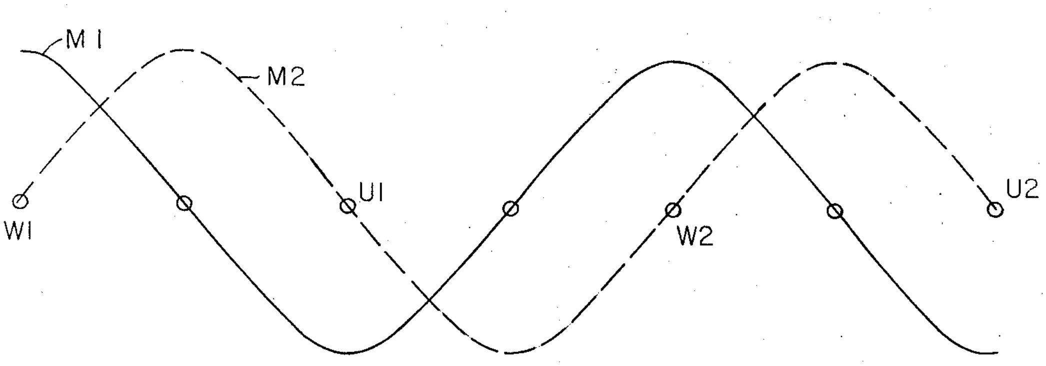
FIG. 8 depicts the basic "sine" and "cosine" signals generated in the invention.

To understand the manner in which the "sine" and "cosine" signals are generated, consider FIG. 3 in which the line L1 represents the plot of signal amplitude obtained from the stylus as the stylus is moved transversely to the wire W1 as the wire is repetitively pulsed. Where the plot for stylus signal strength is obtained for a number of wires W1, W2, . . . regularly spaced apart in the manner depicted in FIG. 4 the cusped waveform CW1 is obtained even when all the wires in the group are pulsed together. Where a second group of wires U1, U2, . . . is interleaved with the first group of wires W1, W2, . . . as shown in FIG. 5, and each group of wires is pulsed in turn, the two cusped waveforms CW1 and CW2 can be obtained by plotting amplitude of the signals obtained from the stylus. The CW1 and CW2 signals can be combined to obtain one of the basic signals by inverting one of the cusped waves and algebraically summing the signal amplitudes of the waveforms CW1 and CW2. This is indicated in FIG. 6 by the inversion of the waveform CW2 and by waveform M1 which is derived from the algebraic summation of CW1 and CW2. The M1 waveform while not necessarily sinusoidal, is periodic because its amplitude changes recur regularly with displacement along the coordinate axis. For convenience, the M1 waveform is herein termed the "sine" wave although that waveform may in fact more closely approximate the form a triangle or a trapezoid. Assuming third and four groups of wires are disposed, as indicated in FIG. 7, to interleave with the W1, W2, . . . and U1, U2, . . . wire groups, and that each group of wires is pulsed in turn, two additional cusped waveforms CW3 and CW4 are obtained. The CW3 and CW4 waveforms are combined in the manner previously explained to obtain the periodic waveform M2 shown in FIG. 8. It is apparent that waveform M2 is shifted in phase relative to waveform M1.

Upon considering the interval between wires W1 and W2 to represent 360°, it can be appreciated that waveforms M1 and M2 differ in phase by 90°. Inasmuch as the M1 waveform has been termed the "sine" wave, the M2 waveform is here designated the "cosine" wave.

In the preceding discussion, all the wires in a group are described as driven in parallel so that all the wires in the group are pulsed together. By so operating the grid system, only four drivers are required for the X Cartesian set and only four drivers are required for the Y Cartesian set, as explained in my aforesaid copending application.

The procedure for obtaining the requisite subdivision of the basic waveform intervals is based on using repetitive trigonometric functions. It this procedure two sinusoids which are 90° out of phase and have a cycle length equal to the interval to be divided, form the basic signals. It is well known to those versed in signal processing technology, that by combining appropriate ratios of these two basic signals, other sinusoids may be produced with phase angles which are retarded or advanced with respect to the original basic signals. For example, to divide an interval into sixteen parts, eight phase displaced sinusoids may be employed to provide a total of 16 points at which these signals cross the zero axis. The number of crossovers occurring over the interval determine the number of divisions in the interval. By causing the sinusoids to be successively phase displaced by 22 ½° over an interval of 360°, the 360° is subdivided into 16 equal parts by the zero axis crossings.

Figures 9, 10:
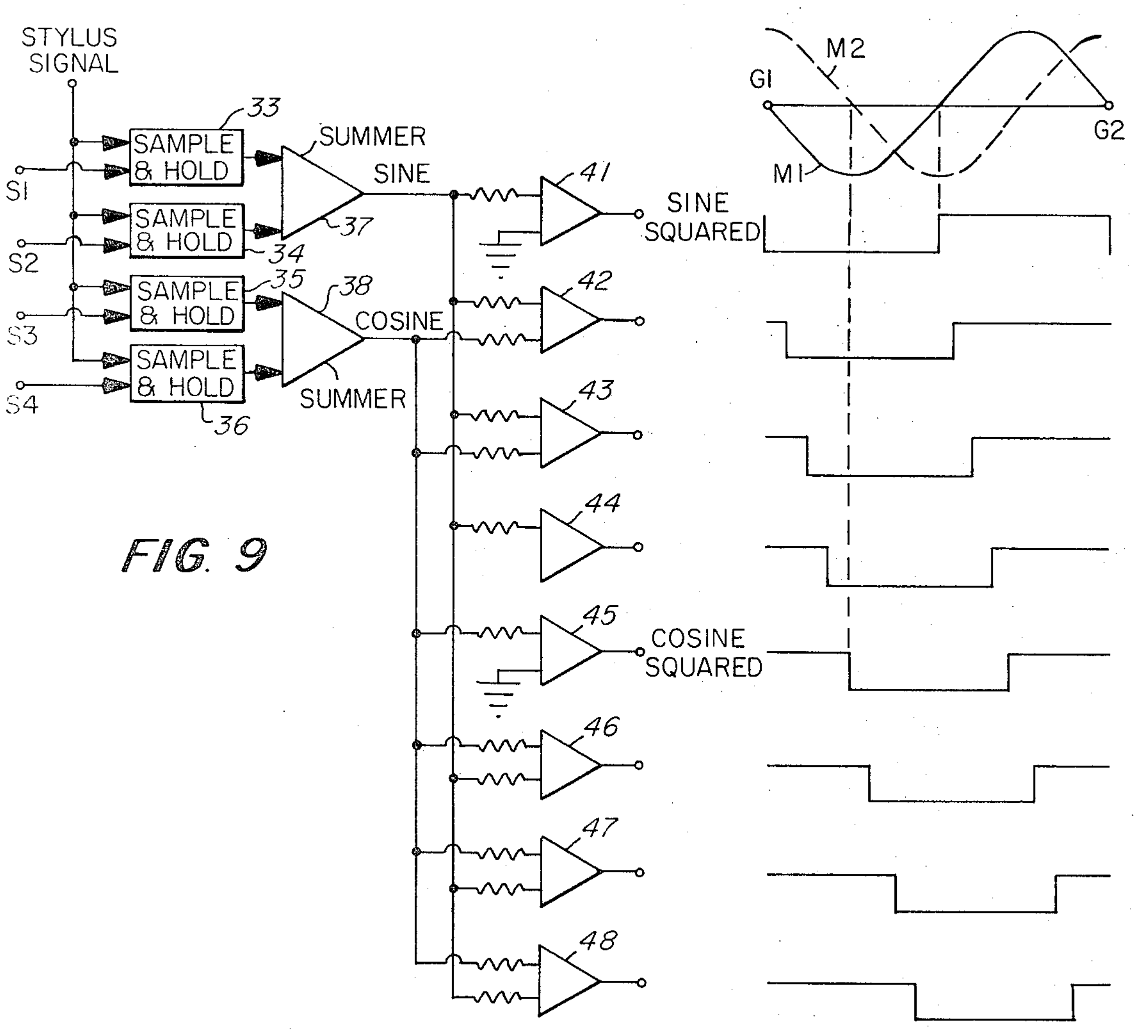
FIG. 9 shows a schematic diagram arrangement for generating the basic "sine" and "cosine" signals.
FIG. 10 shows phase displaced square waves emitted by the FIG. 9 comparators.

FIG. 9 schematically shows the arrangement for utilizing the stylus signals derived from pulsing the groups of wires to generate the "sine" and "cosine" signals. Inasmuch as each group of wires is pulsed in its own exclusive time interval, the sample and hold devices 33, 34, 35, and 36, are arranged to store the signals from the stylus. When the W1, W2, . . . group of wires is pulsed, a signal S1 is simultaneously applied to cause device 33 to sample the output of the stylus and hold the sampled signal. Similarly, when the U1, U2, . . . group of wires is pulsed a signal S2 is simultaneously impressed on the device 34 to cause that device to sample the output of the stylus and hold the sampled signal. A similar sequence of operations occurs when wires R1, R2, . . . and T1, T2, . . . are pulsed.

The outputs of devices 33 and 34 provide the inputs to summer 37 and the output of that summer is the basic "sine" signal. Similarly, the outputs of sample and hold devices 35 and 36 provide the inputs to summer 38 whose output is the basic "cosine" signal. As previously explained, those basic signals vary in a periodic manner when the stylus is moved along the coordinate axis. The rate at which those signals vary depends upon the speed of the movement of the stylus. Where the stylus is stationary, the "sine" and "cosine" signal outputs are DC signals. The summers 37 and 38 accomplish the inversion of one of the inputs as previously mentioned with reference to FIG. 6.

The "sine" and "cosine" signal outputs of summers 37 and 38 provide the inputs to a group of comparators 41, 42, 43, 44, 45, 46, 47, and 48, whose outputs are the square waves depicted in FIG. 10. Comparator 41 emits a square wave, for example, which makes its transition when the stylus passes through the zero crossing of the M1 "sine" wave. Thus, the output of comparator 41 may be termed the "sine square" wave. Comparator 42 emits a square wave that is displaced in phase by 22 ½ relative to the square wave emitted by comparator 41. When the stylus is moved over a whole cycle of the "sine" wave the comparators 41–48 each emit a square wave which has its transition at a different point along the basic "sine" wave.

It is noted in FIG. 9 that each of the comparators 41–48 have resistors at their inputs. These resistor values are selected as is known in the art to provide the different phase displaced squarewave signals shown in FIG. 10.

From the foregoing, it is apparent that each subinterval of the basic waveform is defined by a transition of a comparator output. These waveforms are combined so that when the movement of the stylus causes a comparator transition to occur, a pulse is emitted on one or the other of two output lines. The direction of motion of the stylus determines on which of the output lines the pulse appears. For clarity, only the "sine" and "cosine" squarewaves are used for the exposition as the basis of operation is easily extended to a larger number of waveforms.

Figure 11:
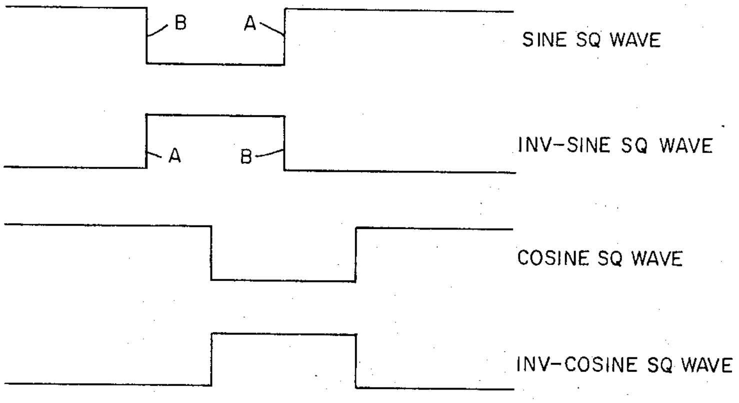
FIG. 11 shows the SINE and COSINE square waves depicted in FIG. 10 and their negations.

Referring now to FIG. 11, there is shown the "sine" and "cosine" squarewaves. Hereinafter, the "sine" squarewave shall be designated SINE and the "cosine"

squarewave shall be designated COSINE. FIG. 11 also shows the squarewaves, INV-SINE and INV-COSINE, which are inversions of the SINE and COSINE waveforms. For ease of exposition, it is assumed that if the stylus moves from left to right the waveforms depicted in FIG. 11 are generated from left to right whereas if the stylus moves in the opposite direction the waveforms are generated from right to left in relation to stylus motion.

If the SINE and INV-SINE squarewaves are differentiated and the stylus is moved from left to right, the positive derivatives of these two waveforms occur at transition A and the negative derivatives occur at transition B. If the stylus is moved from right to left, transition A generates a negative derivative and transition B generates a positive derivative. Thus, it is possible to determine the direction of motion by observing the polarity of the waveform derivatives. The pulses are electronically segregated into two groups each group defining motion in one or the other of the two directions of motion. In the embodiment of the invention discussed with reference to FIGS. 12A and 12B, the negative derivatives are discarded and use is made only of the positive derivatives. Obviously, in other embodiments of the invention, the negative derivatives can be used instead of the positive derivatives.

In the following exposition, the derivative of the SINE is designated as the SINE–D signal and the derivative of the COSINE is designated as the COSINE–D.

Figure 12A:
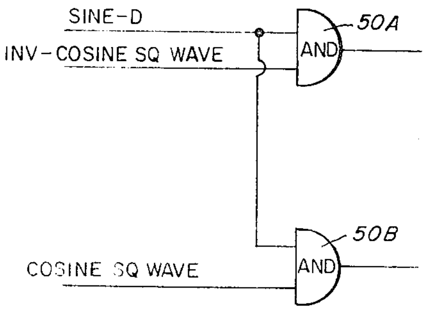
FIG. 12A shows one embodiment for the position determination logic.
Figure 12B:
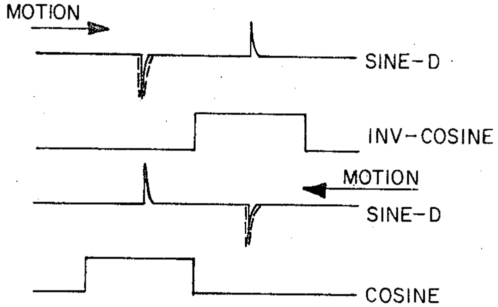
FIG. 12B shows waveforms associated with the logic of FIG. 12A.

In FIG. 12A there is shown AND gates 50A and 50B. The SINE–D (derivative of SINE) is gated by the INV–COSINE in gate 50A and by the COSINE in gate 50B. Referring to the accompanying waveforms shown in FIG. 12B, it can be seen that if the stylus is moved from the left to the right, the positive SINE–D derivative occurs when the INV–COSINE is positive. Thus, gate 50A emits a pulse as the stylus crosses this transition. The negative SINE–D derivative is blocked. If the stylus is moved in the opposite direction, the positive SINE–D derivative occurs when the COSINE is positive and thus gate 50B emits a pulse instead of gate 50A. In the embodiment shown in FIG. 12A, gates 50A and 50B emit pulses at different physical positions of the stylus. This may be remedied by adding four additional gates as depicted in FIG. 13A.

Figure 13A:
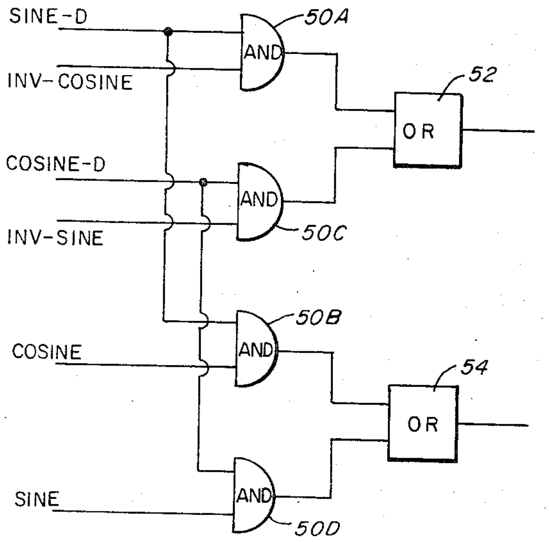
FIG. 13A shows another embodiment for the position determination logic.

FIG. 13A shows the same gates 50A and 50B shown in FIG. 12A together with additional AND gates 50C and 50D. The outputs of gates 50A and 50C provide the inputs to OR gate 52. Similarly, the outputs of gates 50B and 50D are fed to OR gate 54.

Figure 13B:
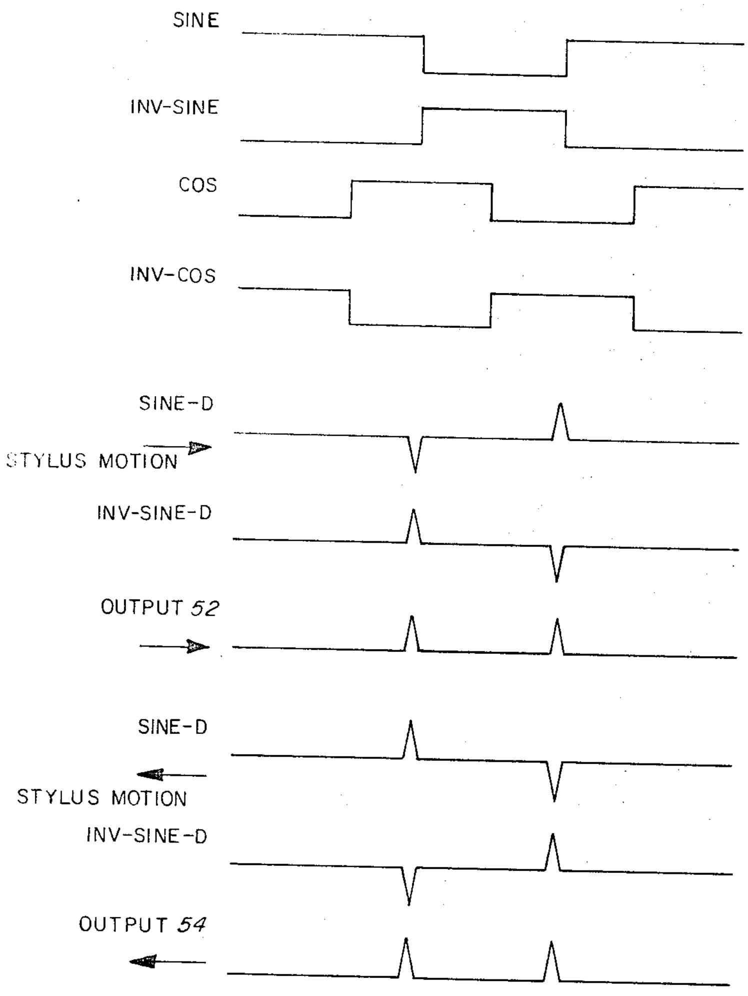
FIG. 13B shows waveforms associated with the logic of FIG. 13A.

The logic arrangement of FIG. 13A emits two output pulses from gate 52 when the stylus moves from left to right over a SINE interval. When the stylus moves from right to left, two output pulses are emitted from gate 54. FIG. 13B shows waveforms associated with the "logic" of FIG. 13A. Of these waveforms some are identical to those shown in FIG. 11. For left to right motion, two pulses are shown to be emitted from the output of gate 52. For movement from right to left, two pulses are shown to be emitted at the output of gate 54. The pulses from gates 52 and 54 are spacially concurrent, as illustrated in FIG. 13B.

Figures 14, 17A, 17B, 17C:
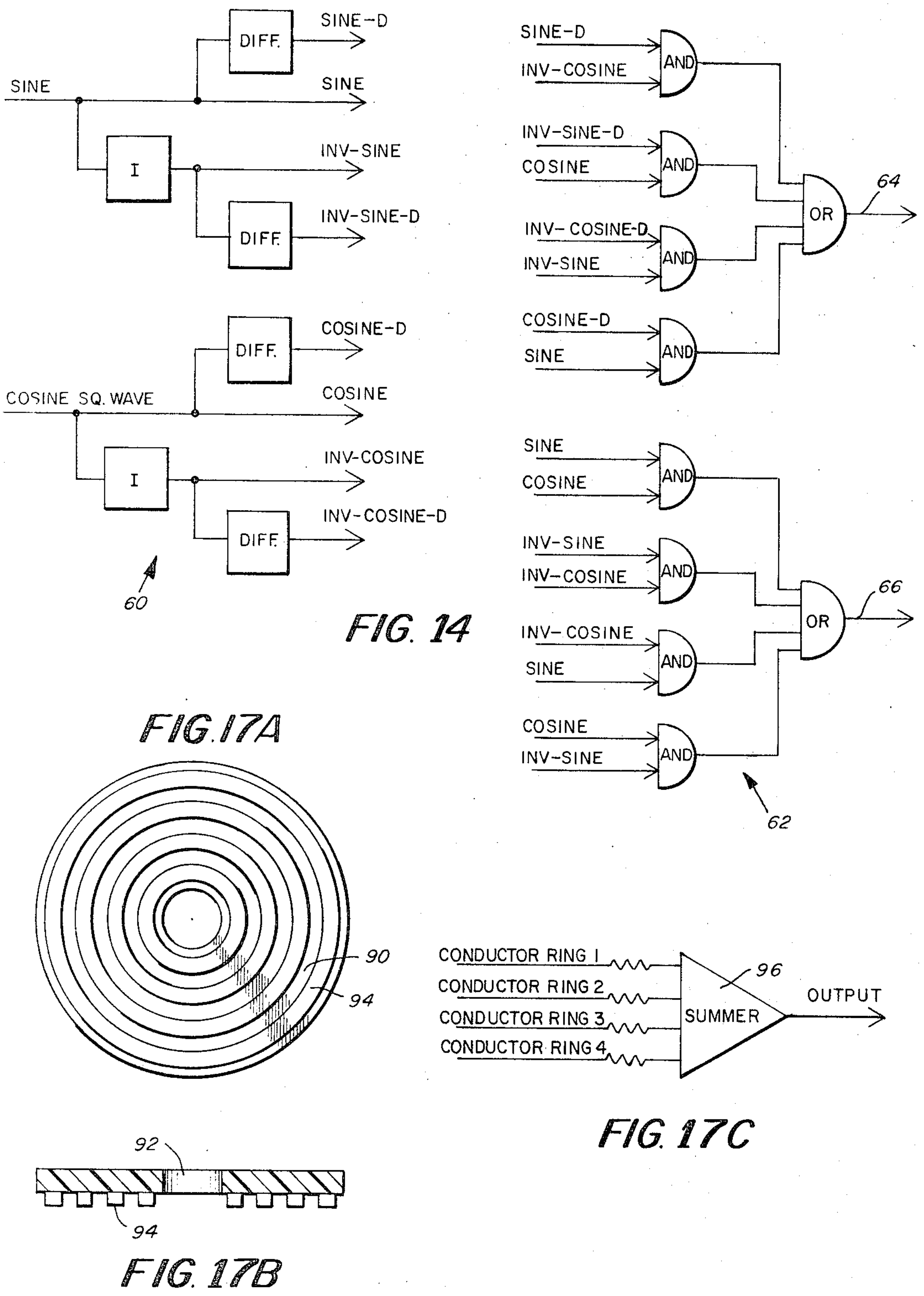
FIG. 14 shows another more complex embodiment for the position determination logic for increased resolution and accuracy.
FIG. 17A shows a top view of a cursor employed in this invention in one embodiment.
FIG. 17B is a cross-sectional view taken along line 17—17 of FIG. 17A.
FIG. 17C shows a summer circuit used with the cursor of FIGS. 17A and 17B.

It was stated early in this exposition that in the division of an interval, an output pulse is obtained for each transition of a squarewave. In the example of FIG. 13A, outputs are obtained only for transitions of the SINE squarewave. The pulse output for the COSINE squarewave transitions are obtained by differentiating the COSINE squarewaves and gating them with the SINE and INV–SINE squarewaves. FIG. 14 shows the gating logic that is used to generate the necessary four pulses for each direction of movement. Extensions to larger numbers of squarewaves involves adding additional gates and differentiators. Thus, eight squarewaves divide the cycle into sixteen parts. The number of subdivisions may be increased or decreased by generating more or fewer squarewaves.

The logic arrangement of FIG. 14 shows a suitable waveform generator 60 having a plurality of differentiators and inverters for generating the SINE and COSINE waveforms, their differentiated waveforms and their inverted waveforms. FIG. 14 also depicts a logic arrangement 62 which employs eight AND gates and two OR gates for generating output pulses on either line 64 or 66, depending upon the direction of stylus movement.

The invention has thus far been described in relation to a mode of operation in which the wires of the grid are "pulsed." In that mode of operation, all the wires of a group are concurrently excited by a pulse. It has been found that improved operation can be obtained by using a pulse constituted by a short burst of a sinusoidal signal. In the preferred mode of operation, this pulse is constituted by five cycles of a 100-K Hertz sinusoid. Each group of wires is, in turn, activated by the five cycle burst; first the four groups of the X axis and then the four groups of the Y axis. Thus, eight time cycles are used to obtain two-axis coordinate data for a stylus position. Each peak of the sinusoid is entered into the sample and hold circuit, whose time constant or acquisition time is such as to provide some integration of the sample signals, thus providing an improvement in signal to noise ratio.

It is also noted in accordance with this invention that in a preferred embodiment, the stylus commences from an initial position and the incremental pulses which indicate direction of movement are generated as the stylus is moved from this initial position. In this way, the X and Y coordinates can be determined as long as the stylus is not removed from the surface. In another application it is not necessary to start it in an initial starting point with the stylus as only changes in the position are to be monitored.

Figure 15:
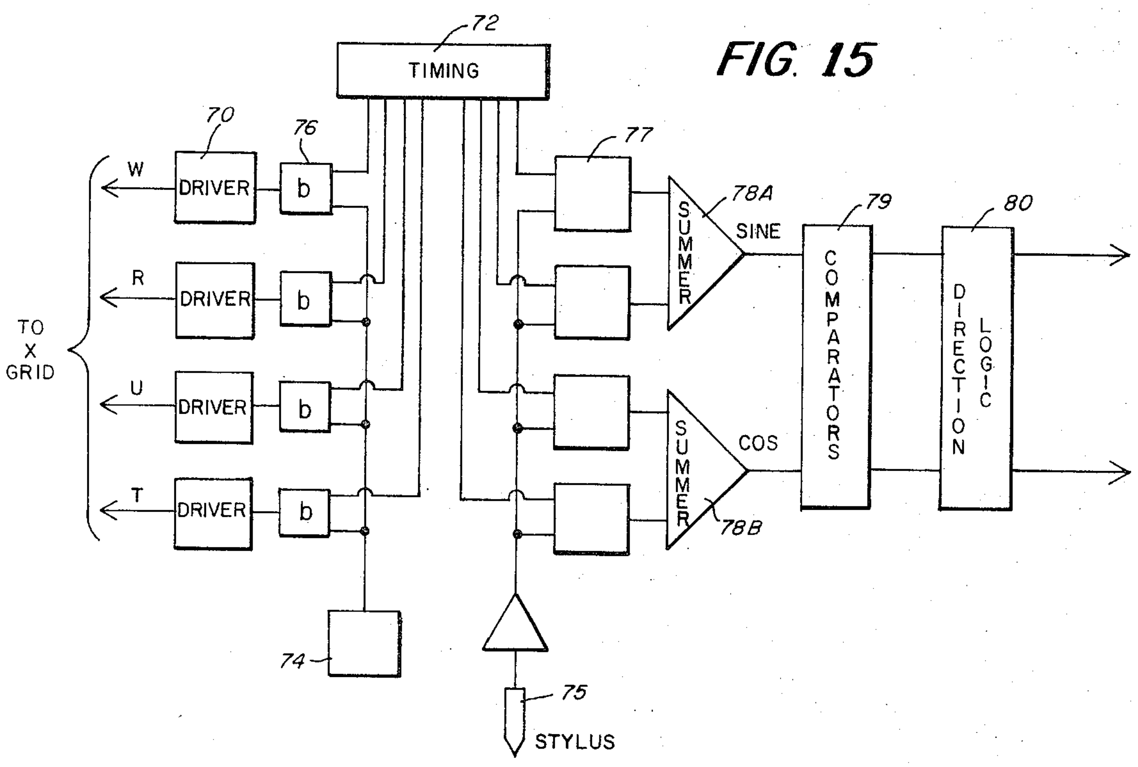
FIG. 15 shows a system block diagram for the incremental system disclosed herein.

Referring now to FIG. 15, there is shown a block diagram of an embodiment of the invention using the short bursts of sinusoidal signal for driving the grid wires. For the sake of clarity in FIG. 15 only, the X axis is depicted.

In FIG. 15, the wire groups are identified as groups W, R, U, and T, as they were identified in FIG. 2. Each of these wire groups, in sequence, receives a signal from one of the drivers 70 which are controlled by a timing generator 72. The sinusoidal signal is provided by a 100 $KH_z$ oscillator 74. The output of this oscillator couples to gates 76 which are selectively enabled by generator 72 to couple signals to the drivers 70.

Timing generator 72 also controls the sampling of the sensed waveforms from stylus 75. Thus, signals are coupled to sample and hold circuits 77 and the outputs of these circuits are coupled to summers 78A and 78B. The sample and hold circuits and the summers are arranged in a similar manner as previously discussed with reference to FIG. 9. Accordingly, the outputs of the summers connect to comparators 79 and direction logic 80. The output pulses from direction logic 80 may be used as input pulses to a bidirectional counter (not shown). The counter then keeps track of the transition crossings and thus provides a continuous indication of stylus position. The directional logic 80 shown in FIG. 15 may be of the type shown in either FIGS. 12A, 13A, or 14.

Figure 16:
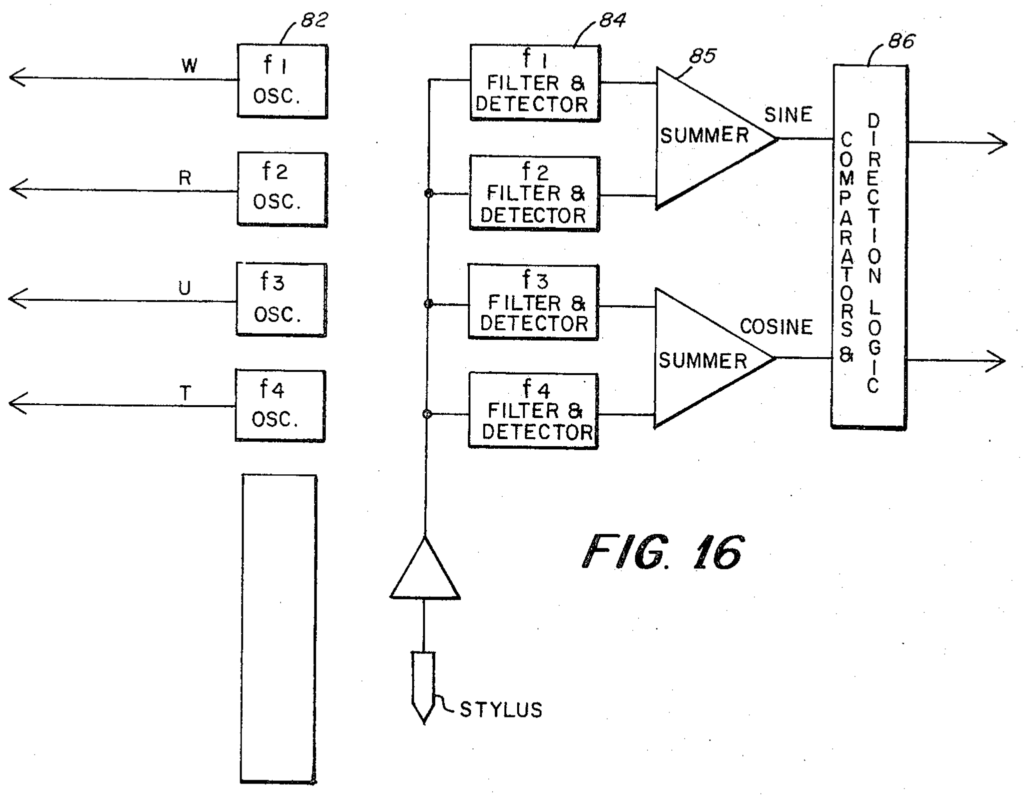
FIG. 16 is a system block diagram similar to that shown in FIG. 15 for another embodiment of the invention.

Another embodiment of the invention is shown in FIG. 16. This embodiment of the invention is similar to the one shown in FIG. 15, the basic difference being that instead of using an exclusive time interval to identify the signal from a wire group of the grid structure, frequency discrimination is used to identify the wire group from which the signal originates. Thus, in FIG. 16, an array of oscillators 82 is employed, each of which oscillates at a different frequency. These different frequency signals are coupled to grid groups W, R, U, and T so that all the grid groups are simultaneously excited. The stylus, therefore, "picks up" signals from all the wire groups simultaneously and the signals are sorted out according to the wire group from which the signal originated. This mode of operation permits faster scanning of the coordinate axis because stylus signals from all the wire groups can be obtained simultaneously. To sort out the stylus signals according to the wire group of origination, the output of the stylus is coupled to a group of filters 84 which separate the signals according to frequency. Where the signals are modulated, the modulation envelope can be recovered in the conventional manner by detecting the filtered signals. Consequently, in FIG. 16 the blocks 84 are labeled "filter and det." The outputs of the blocks 84 are equivalent to the outputs of the sample and hold devices depicted in FIG. 9 and hence can be utilized in the previously described manner to generate the square waves depicted in FIG. 10. Thus, the comparators 41 through 48 of FIG. 9 are included with the FIG. 16 block labeled "comparators and direction logic." The direction logic can be the same as that previously described in connection with FIGS. 12, 13, and 14.

For some applications, a more uniform waveform may be required than that which is obtained by using a single point stylus. If there are small non-uniformities in the grid structure, some distortion of the basic cyclic waveforms will occur. For higher accuracy application it is desirable to be able to average the waveforms from several cycles of the grid structure in order to average out small irregularities and produce a cleaner signal. This can be accomplished by replacing the stylus described herein before with a cursor structure of a type shown in FIGS. 17A and 17B. As indicated in FIGS. 17A, the cursor comprises an annular member 90 having an opening 92 at its center. The annular member includes a plurality of concentric rings 94. The diameters of the conductor rings correspond to the spacing of the basic cycle of the digitizer grid. These rings are summed together. The net output of the cursor is thus the sum of the signals from a number of grid wires equal to the number of concentric rings. Although the concentric rings cross a particular grid structure in a perpendicular direction, as well as tangentially, the net area change between the platen grid and the concentric ring pattern is 2:1 even allowing for edge effects. Thus, the capacity and signal amplitude vary accordingly. As the ring pattern is identical in all directions, it is not orientation sensitive and functions for both X and Y grids.

The summed signals are an average of all grid signals under the cursor thus small irregularities in the grid are averaged out thereby increasing good accuracy. The center of the cursor is open and it is normally supplied with a cross hair for positioning the cursor over the point to be digitized.

FIG. 17C shows a summer 96 having a number of inputs that can connect to the conductor rings. The output of summer 96 is in effect equivalent to the output of the stylus.

The logical configurations described in this exposition are not meant to limit the extent of the claims but only serve to define the method in which the basic signals may be used to provide useful outputs. For example, in my co-pending application the basic cycle is used to develop an absolute binary word which is cyclic over the grid structure. In the previous application, the entire grid structure is such as to give an absolute location for each coordinate point. In the present disclosed embodiment the system is of the incremental type. Each of these types have their own particular advantages and applications.

What is claimed is:

1. In a system for locating the position of a stylus movable along a coordinate axis, the system being of the type having a platen having groups of parallel wires, the wires of each group being interleaved with and parallel to the wires of the other groups whereby the wires of the groups repetitively occur in the same successive order along the coordinate axis, the stylus having an electrical conductor providing capacitive coupling to the wires of the platen, means for simultaneously energizing all the wires of a group with an electrical signal, each group of wires being characterized by its own identifying signal, means connected to the output of the stylus for deriving from each group of wires a signal whose amplitude is dependent upon the strength of the signal capacitively coupled to the stylus by that group of wires, the improvement of signal combining means responsive to the ratio of the amplitudes of the derived signals, the signal combining means providing a basic signal which varies periodically in amplitude as the stylus is moved at a uniform ratio along the coordinate axis.

2. The improved system according to claim 1 for locating the position of the stylus, including the further improvement of means for deriving pulse signals from the basic signal as the stylus is moved along the coordinate axis, and means responsive to the derived pulse signals for maintaining a count related to the position of the stylus.

3. The improved system according to claim 2, further including the improvement of logic gating means responsive to the derived pulse signals and to gating signals derived from the basic signal, the logic gating means providing output signals related to the direction of movement along the coordinate axis.

4. The improved system according to claim 3, wherein the logic gating means causes the derived pulse signals to appear at different outputs in dependence upon the direction of movement of the stylus and wherein the means maintaining a count related to the position of the stylus is a reversible counter having as inputs the different outputs of the logic gating means.

* * * * *